United States Patent [19]

Thul

[11] Patent Number: 5,201,433

[45] Date of Patent: Apr. 13, 1993

[54] ESCUTCHEON FOR COVERING CONCEALED SANITARY FITTINGS

[75] Inventor: Alfons Thul, Mehren, Fed. Rep. of Germany

[73] Assignee: American Standard Inc., New York, N.Y.

[21] Appl. No.: 786,497

[22] Filed: Nov. 1, 1991

[30] Foreign Application Priority Data

Nov. 2, 1990 [DE] Fed. Rep. of Germany ....... 4034898

[51] Int. Cl.⁵ .............................................. H02G 3/14
[52] U.S. Cl. .................................... 220/241; 220/242; 220/256; 220/306; 220/3.8; 174/66; 174/67; 52/221; 137/359
[58] Field of Search ............... 220/241, 242, 256, 306, 220/3.8, 3.5, 3.6, 3.7; 174/67, 66; 137/359; 52/221

[56] References Cited

U.S. PATENT DOCUMENTS

| 848,888 | 4/1907 | Erickson | 220/3.7 |
| 2,510,745 | 6/1950 | Kilgore | 220/242 X |
| 4,366,866 | 1/1983 | Sweeney | 174/66 X |
| 4,803,307 | 2/1989 | Shotey | 174/67 X |
| 4,989,633 | 2/1991 | Humpert et al. | 137/359 X |

Primary Examiner—Gary E. Elkins
Assistant Examiner—Paul A. Schwarz
Attorney, Agent, or Firm—Blum Kaplan

[57] ABSTRACT

An escutcheon assembly for covering an opening in a wall through which a sanitary fitting extends. The assembly includes an inner plate which is removably secured to the fitting on the outside surface of the wall. A cover plate is releasably coupled over the inner plate.

5 Claims, 3 Drawing Sheets

ESCUTCHEON FOR COVERING CONCEALED SANITARY FITTINGS

BACKGROUND OF THE INVENTION

The invention relates to an escutcheon for sanitary water fittings, especially concealed fittings.

As is known, concealed fittings are located in the installation wall up to the operating element or operating elements, e.g., handles, levers, pull knobs, etc. The covering of the installation opening and with it the concealed fittings as well as their connections is attained by means of a suitably large escutcheon, which is usually connected with the fittings body by screws. The escutcheon is thereby supported with insertion of an outer ring packing at the installation wall, in the area of the edge of the installation opening.

A disadvantageous feature of the known escutcheons for sanitary water fittings, especially concealed fittings, is the fact that the heads of the screws with which the known escutcheons are connected to the fitting bodies remain visible. Apart from visual esthetic disadvantages, the danger exists that the screw heads and the escutcheon itself may be damaged by scratches during the insertion of the screws into the filling bodies, and deformation of the escutcheon is not infrequent. In addition, care of the escutcheons is difficult in the area of the screw heads.

SUMMARY OF THE INVENTION

The object of the invention is that of providing an escutcheon free from the above mentioned disadvantages.

The escutcheon for sanitary water fittings in accordance with the invention, especially for concealed fittings, in which the above mentioned objective is met, is first of all and essentially characterized by an inner mechanism plate supported at the installation wall and an outer cover plate. It is preferable for the escutcheon according to the invention for the inner mechanism plate to be designed with means for attachment, and for the outer cover plate to be attachable to the inner mechanism plate, whereby the outer cover plate covers the attachment means engaging the inner mechanism plate.

BRIEF DESCRIPTION OF THE DRAWINGS

Various detailed possibilities exist for designing and expanding escutcheons for sanitary water fittings according to the invention, especially for concealed fittings. It is possible to refer in this connection to claim 1 of the claims below, on the one hand, and to the following description of an execution example, on the other. The following features are represented in the drawing:

DESCRIPTION OF THE PREFERRED EMBODIMENTS

Figure 1:
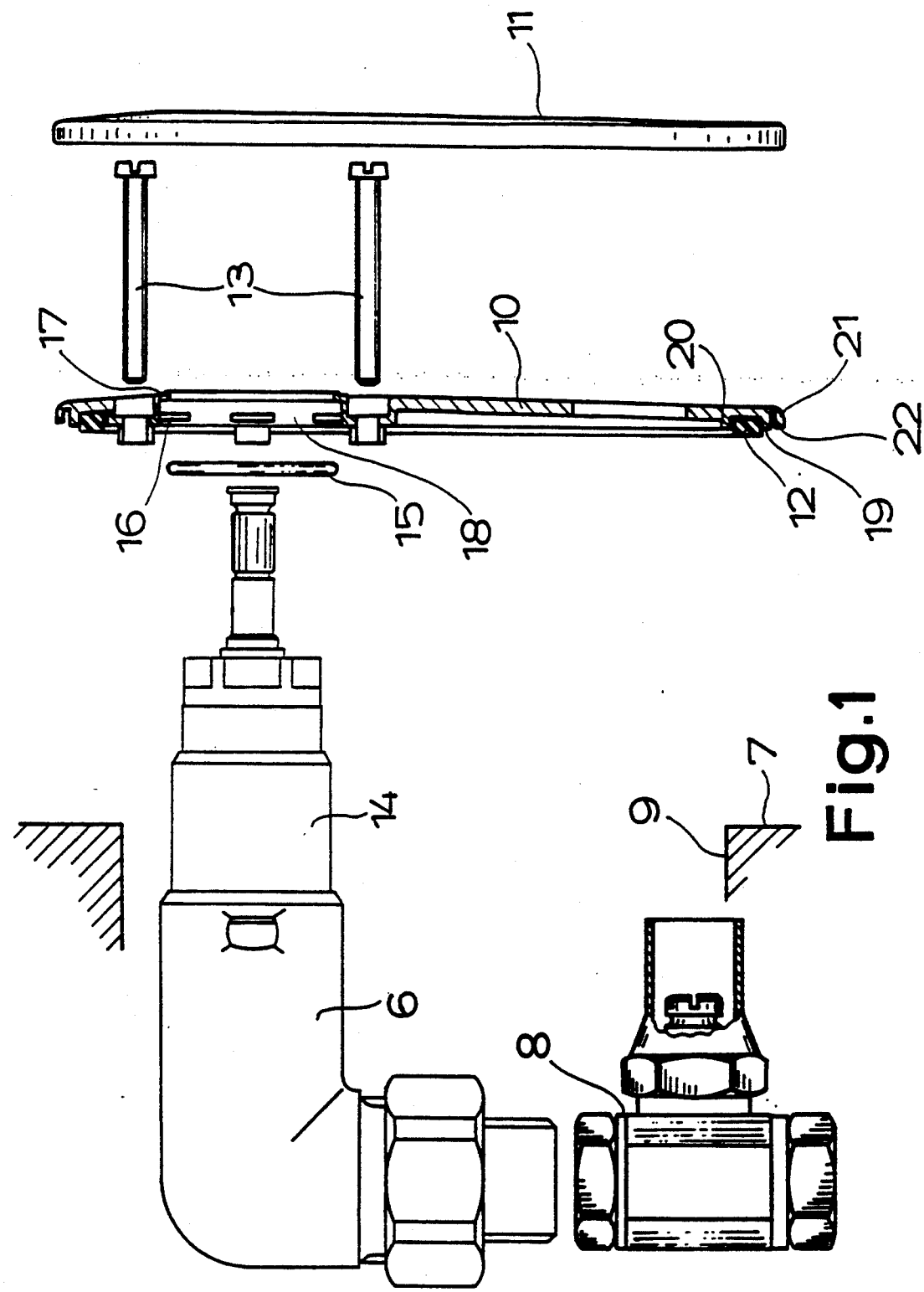
FIG. 1 an exploded representation of a sanitary concealed fitting with an escutcheon according to the invention.

Concealed fitting 6 is schematically represented in FIG. 1, arranged in installation wall 7, and vent with valve 8 is connected to an unrepresented water line.

The escutcheon according to the invention serves for covering installation opening 9 provided in installation wall 7, and thereby concealed fitting 6 and vent with valve 8. The escutcheon consists of inner mechanism plate 10 supported at installation wall 7 and outer cover plate 11. Inner mechanism plate 10 is sealed against installation wall 7 by ring seal 12 and is designed for the attachment of attachment means 13. Outer cover plate 11 is attachable to inner mechanism plate 10 and covers attachment means 13 connected to inner mechanism plate 10. In the execution example represented, screws are provided as attachment means 13. The corresponding screw holes are not represented. During attachment, mechanism plate 10 of the escutcheon according to the invention is pushed over cover case 14 of concealed fitting 6. The seal between cover case 14 of concealed fitting 6 and mechanism plate 10 of the escutcheon according to the invention is achieved by means of ring seal 15, which is arranged between ribbing 16 and inner collar 17 in opening 18 of mechanism plate 10.

Figure 2:
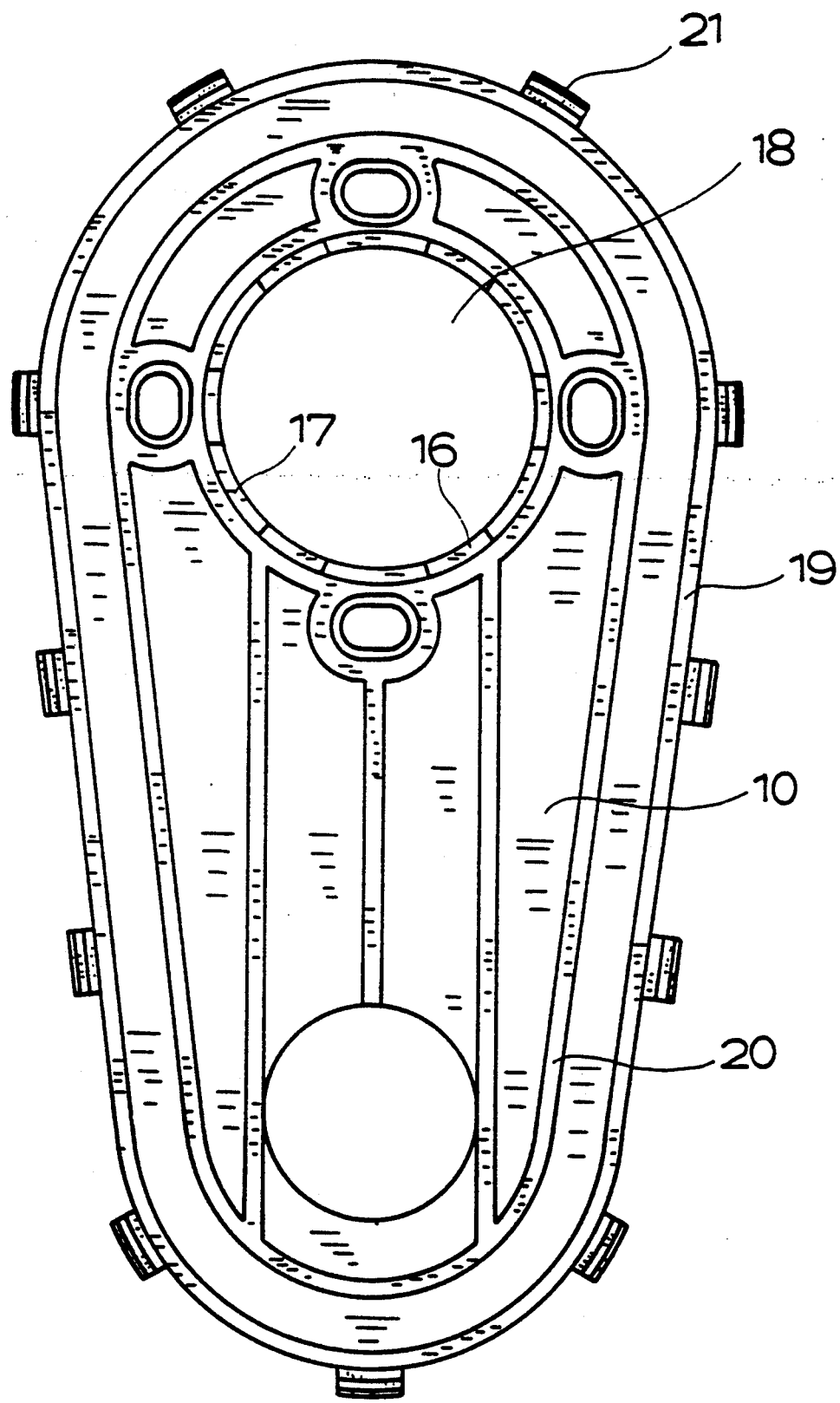
FIG. 2 the mechanism plate of the escutcheon according to the invention, seen from behind.
Figure 3:
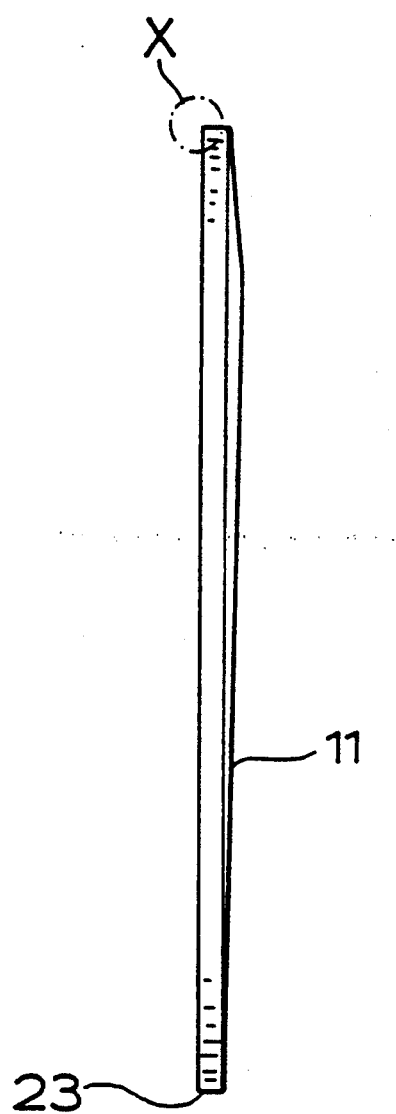
FIG. 3 a longitudinal section through the cover plate of the escutcheon according to the invention.
Figure 4:
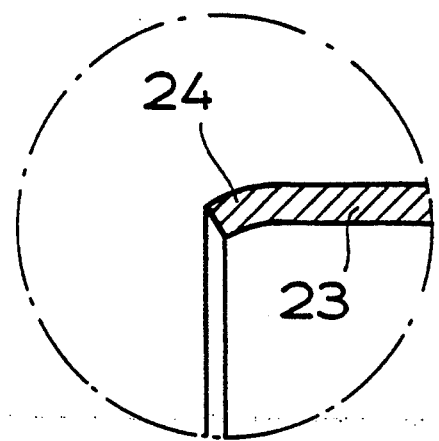
FIG. 4 detail X of the cover plate represented in FIG. 3 of the escutcheon according to the invention, in enlarged representation.
Figure 5:
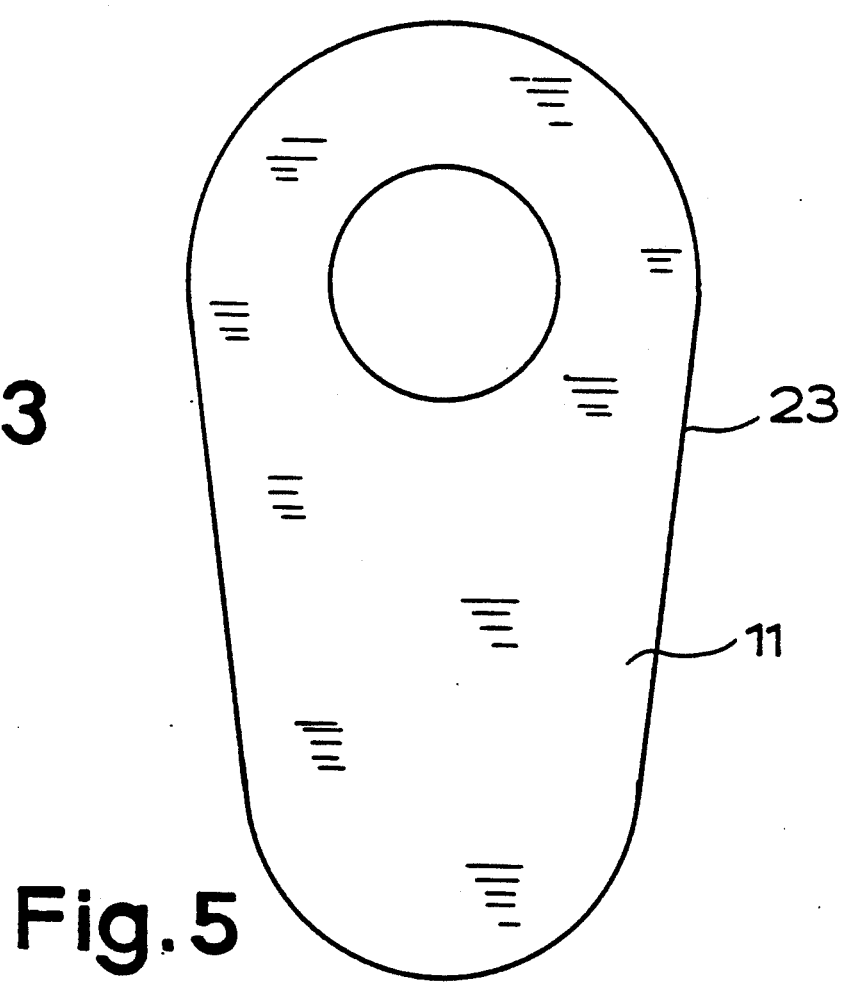
FIG. 5 the cover plate of the escutcheon in accordance with the invention, seen from behind.

As is seen in FIGS. 1 and 2, mechanism plate 10 of the escutcheon according to the invention is supported by outer support edge 19 and inner support edge 20 at installation wall 7, as well as by ring seal 12. Ring seal 12 is thereby held between support edges 19 and 20.

It has already been mentioned above that, in the escutcheon according to the invention, outer cover plate 11 is attachable to inner mechanism plate 10. Flexible nose-shaped projections 21 are located in the execution example represented at outer support edge 19 of mechanism plate 10. Nose-shaped projections 21 are set back in relation to support edge 19. The free ends 22 of nose-shaped projections 21 thus do not come in contact with installation wall 7. Nose-shaped projections 21 of mechanism plate 10 collaborate with clamping edge 23 of cover plate 11 to attach cover plate 11 to mechanism plate 10. In attached state, cover plate 11 is located at a distance from installation wall 7. End area 24 of clamping edge 23 of cover plate 11 turned to installation wall 7 is bent inward in order to assure the attachment. Since clamping edge 23 is at a distance from installation wall 7 in the attached state of cover plate 11, it is easy to detach cover plate 11 with a tool, so that covered attachment means 13 are accessible at any time for possibly necessary maintenance and/or repair work.

The escutcheon according to the invention, described above in connection with concealed fitting 6, is not limited to use in connection with concealed fittings. On the contrary, the escutcheon in accordance with the invention can also be used for water fittings assembled on washstands, bidets, bathtubs, and the like. It is thus usual in the United States, for example, to provide the fittings area of washstands with three holes, in order to be able to install a three-hole fitting, if desired. On the other hand, if only a single-hole fitting is desired, for example in the form of a single-lever mixer or a two-knob mixer, the other two holes must be closed. This can be done according to the invention with a penetrating inner mechanism plate or with two separate inner mechanism plates, which is or are connected with the fitting area. A cover plate or plates can again be attached to the mechanism plate or plates.

I claim:

1. An escutcheon assembly for covering an opening in a wall through which a sanitary fitting extends, comprising a first plate, attachment means for releasably attaching said first plate about said opening on the outside of said wall, a cover plate removably coupleable over said first plate for covering said first plate and for providing a finished appearance to said assembly, said first plate including resilient projections on the outer periphery thereof and said cover plate including an outer rim edge that is bent inwardly for cooperation with said resilient projections to releaseably hold said cover plate over said first plate.

2. The escutcheon assembly as claimed in claim 1, wherein said outer rim edge of said cover plate deforms said resilient projections of said first plate.

3. The escutcheon assembly as claimed in claim 1, wherein said first plate includes a ring seal therearound to seal said first plate against said wall.

4. The escutcheon assembly as claimed in claim 1, wherein said first plate includes an opening therein through which said sanitary fitting extends and a ring seal about said opening for sealing around said sanitary fitting.

5. The escutcheon assembly as claimed in claim 1, wherein said cover plate includes an opening therein through which said sanitary fitting extends.

* * * * *